(12) United States Patent
Tomita (10) Patent No.: US 6,977,880 B2
(45) Date of Patent: Dec. 20, 2005

(54) MULTI-LAYERED DISC AND MULTI-LAYERED DISC REPRODUCING APPARATUS

(75) Inventor: Yoshimi Tomita, Tsurugashima (JP)

(73) Assignee: Pioneer Corporation, Tokyo-to (JP)

( * ) Notice: Subject to any disclaimer, the term of this patent is extended or adjusted under 35 U.S.C. 154(b) by 527 days.

(21) Appl. No.: 09/985,838

(22) Filed: Nov. 6, 2001

(65) Prior Publication Data

US 2002/0054550 A1 May 9, 2002

(30) Foreign Application Priority Data

Nov. 7, 2000 (JP) .............................. 2000-339746

(51) Int. Cl.⁷ ............................................... G11B 7/00
(52) U.S. Cl. .............................. 369/59.16; 369/47.27; 369/94; 369/275.3
(58) Field of Search .................... 369/94, 47.19, 369/47.22, 47.27, 44.76, 59.11, 97.52, 47.25, 369/47.21, 53.11, 275.1, 275.4, 53.2, 53.16, 369/275.3, 59.16

(56) References Cited

U.S. PATENT DOCUMENTS

| 5,136,560 | A | * | 8/1992 | Hangai et al. ........... 369/47.41 |
| 5,297,125 | A | | 3/1994 | Yamagami et al. |
| 5,428,597 | A | * | 6/1995 | Satoh et al. .................... 369/94 |
| 5,553,044 | A | * | 9/1996 | Tanaka ..................... 369/47.52 |
| 5,608,717 | A | * | 3/1997 | Ito et al. .................. 369/275.1 |
| 5,737,287 | A | | 4/1998 | Lee |
| 6,195,325 | B1 | * | 2/2001 | Okanishi ................. 369/59.26 |
| 6,424,614 | B1 | * | 7/2002 | Kawamura et al. ........... 369/94 |
| 6,501,707 | B1 | * | 12/2002 | Yamaguchi et al. ..... 369/47.28 |

FOREIGN PATENT DOCUMENTS

| EP | 0 818 784 | 1/1998 | |
| EP | 0 987 711 | 3/2000 | |
| EP | 1 111 604 | 6/2001 | |
| EP | 1 187 110 | 3/2002 | |
| WO | WO 9858368 A1 | * 12/1998 | ............ G11B 7/00 |
| WO | WO 00/57410 | 9/2000 | |

* cited by examiner

Primary Examiner—Susan McFadden
Assistant Examiner—Jorge L. Ortiz-Criado
(74) Attorney, Agent, or Firm—Morgan Lewis & Bockius LLP

(57) ABSTRACT

A multi-layered disc (D1, D2, D3) is provided with a plurality of recording layers laminated with each other in a direction of a normal line of the recording layers, in each of which an information data recording area (2, 4) for recording information data and a control data recording area (1, 3) for recording control data to control an operation of recording and/or reproducing the information data are disposed on a same plane, the control data being recorded by a CAV method over a plurality of tracks in the control data recording area. The control data recording area in each of the recording layers is disposed such that the control data recording area (1) of one of the recording layers is not superimposed with the control data recording area (3) of another of the recording layers in the direction of the normal line.

2 Claims, 7 Drawing Sheets

MULTI-LAYERED DISC AND MULTI-LAYERED DISC REPRODUCING APPARATUS

BACKGROUND OF THE INVENTION

1. Field of the Invention

The present invention relates to a multi-layered disc in which a plurality of recording layers for recording information data are laminated, and also to a multi-layered disc reproducing apparatus for reproducing the information data recorded on the multi-layered disc.

2. Description of the Related Art

As one of various types of optical discs, there is an optical disc having a recording surface, which is recorded by a pre-format. This optical disc has a control area and a data area on the recording surface. In the control area, control data, which deal with recording/reproducing conditions, e.g., recording power of a light beam, a recording modulation method, etc., when recording the information data into the data area, are recorded. The control area is separated into a PEP (Phase Encoded Part) area, where one portion of the control data are recorded in the form of a PEP signal, and a SFP (Standard Formatted Part) area, where another portion of the control data are recorded in the form of a SFP signal. In the data area, the information data to be reproduced are recorded as the SFP signal.

Since the PEP signal recorded in the PEP area is arranged such that it can be read out without the tracking servo, the combination of the mirror portion and a plurality of pits indicating 1 bit is recorded with a much larger size than the pit size in the SFP area. In other words, the combinations are recorded with a low density.

Developing the information data with a larger capacity of an optical disc is attempted, and the demand for a multi-layered disc having two or more recording layers is increased. Therefore, as for a multi-layered disc, it is desirable to provide a multi-layered disc having the PEP area in which the above mentioned control data are recorded in the inner circumferential portion of each recording layer, and to provide a multi-layered disc reproducing apparatus which can read out the information data in the data area of each recording layer on the basis of the control data in the PEP area.

SUMMARY OF THE INVENTION

It is therefore an object of the present invention to provide a multi-layered disc and a multi-layered disc reproducing apparatus, by which the control data desired to be reproduced in the recording layer can be accurately read out, and thereby the information data in the data area of the recording layer can be certainly read out.

The above object of the present invention can be achieved by a first multi-layered disc comprising a plurality of recording layers laminated with each other in a direction of a normal line of the recording layers, in each of which an information data recording area for recording information data and a control data recording area for recording control data to control an operation of recording and/or reproducing the information data are disposed on a same plane, the control data being recorded by a CAV method over a plurality of tracks in the control data recording area, the control data recording area in each of the recording layers being disposed such that the control data recording area of one of the recording layers is not superimposed with the control data recording area of another of the recording layers in the direction of the normal line.

According to the first multi-layered disc of the present invention, the control data recording areas of the recording layers, which are recorded with the control data by the CAV method, are disposed at such positions respectively that they are not superimposed or overlapped with each other in the normal direction of the disc. Therefore, when reproducing one control data, which is recorded in one control data recording area, by the multi-layered disc reproducing apparatus, it is possible to prevent another control data recorded in another control data recording area from being superimposed or overlapped with the one control data. Accordingly, it is possible to accurately reproduce the control data, and to thereby reproduce the information data surely from the data area on the basis of the accurately reproduced control data.

The above object of the present invention can be also achieved by a second multi-layered disc comprising a plurality of recording layers laminated with each other in a direction of a normal line of the recording layers, in each of which an information data recording area for recording information data and a control data recording area for recording control data to control an operation of recording and/or reproducing the information data are disposed on a same plane, the control data being recorded by a CAV method over a plurality of tracks in the control data recording area, the control data being recorded in only one of the recording layers.

According to the second multi-layered disc of the present invention, the control data recording areas of the respective recording layers are superimposed or overlapped with each other, and only one of the recording layers is recorded with the control data by the CAV method. Therefore, it is possible for the multi-layered disc reproducing apparatus to accurately reproduce the control data in the control data recording area of any one of the recording layers whose control data recording areas are superimposed with each other In one aspect of the first or second multi-layered disc of the present invention, the control data are recorded as a PEP signal.

By constructing in this manner, it is possible to accurately reproduce the PEP signal which is recorded at a low density in each of the recording layers of the multi-layered disc.

In another aspect of the first or second multi-layered disc of the present invention, the multi-layered disc is further provided with a second control data recording area for recording a second control data to control the operation of recording and/or reproducing the information data in the recording layers.

By constructing in this manner, it is possible to utilize the control data having the larger data volume.

The above object of the present invention can be also achieved by a first multi-layered disc reproducing apparatus for reproducing the information data recorded on the above described first multi-layered disc of the present invention.

The above object of the present invention can be also achieved by a second multi-layered disc reproducing apparatus for reproducing the information data recorded on the above described second multi-layered disc of the present invention.

The first or second multi-layered disc reproducing apparatus is provided with: a detection signal outputting device for outputting a detection signal, which carries the control data in the control data record area, on the basis of a reflected light obtained by an irradiation of a reading light onto the control data recording area; a control data reproducing device for reproducing the control data on the basis of the detection signal outputted from the detection signal outputting device; and an information data reproduction controlling device for reproducing the information data recorded in the information data recording area on the basis of the reproduced control data.

In one aspect of the first or second multi-layered disc reproducing apparatus of the present invention, the control data reproducing apparatus is provided with: a low pass filter for extracting a control data signal based on the control data from the detection signal; and a control data decoder for generating the control data by the control data signal extracted by the low pass filter.

In this aspect having the low pass filter, of the first or second multi-layered disc reproducing apparatus of the present invention, the low pass filter may have a cut-off frequency, which is a double frequency of a repetition frequency of a longest pit carrying the control data, and an attenuation characteristic, which attenuates the detection signal from a standard level of the low pass filter by the cut-off frequency.

In this aspect having the low pass filter, the low pass filter may have an attenuation characteristic which attenuates more than 40 dB from a standard level of the low pass filter at a repetition frequency of a SFP (Standard Formatted Part) signal having a longest pit.

According to the first or second multi-layered disc reproducing apparatus in various aspects thereof, the PEP signals due to the control data are not superimposed on the detection signal outputted by the detection signal outputting device, on the basis of the reflected light obtained by the irradiation of the reading light onto the control data recording area of the recording layer in the multi-layered disc, it is possible to accurately reproduce the control data on the basis of the detection signal supplied from the control data reproducing device.

The nature, utility, and further features of this invention will be more clearly apparent from the following detailed description with respect to preferred embodiments of the invention when read in conjunction with the accompanying drawings briefly described below.

BRIEF DESCRIPTION OF THE DRAWINGS

FIG. 4, consisting of FIG. 4A to FIG. 4D, show a waveform of each signal outputted by each portion of the reproducing apparatus S1 in which FIG. 4A and FIG. 4B are charts showing the waveforms of the RF signal and the PEP data respectively on the basis of the reflective light from the PEP area while FIG. 4C and FIG. 4D are charts showing those on the basis of the reflective light from the dummy area, in the embodiment;

DETAILED DESCRIPTION OF THE PREFERRED EMBODIMENTS

Referring to the accompanying drawings, embodiments of the present invention will be now explained.

Before describing a tangible structure as well as the action or operation of the embodiment of the present invention, a basic structure of the recording surface of the optical disc, which has the control area and the data area, as well as the basic principle of the reproducing operation thereof is explained with reference to FIG. 8 top FIG. 11.

Figure 8:
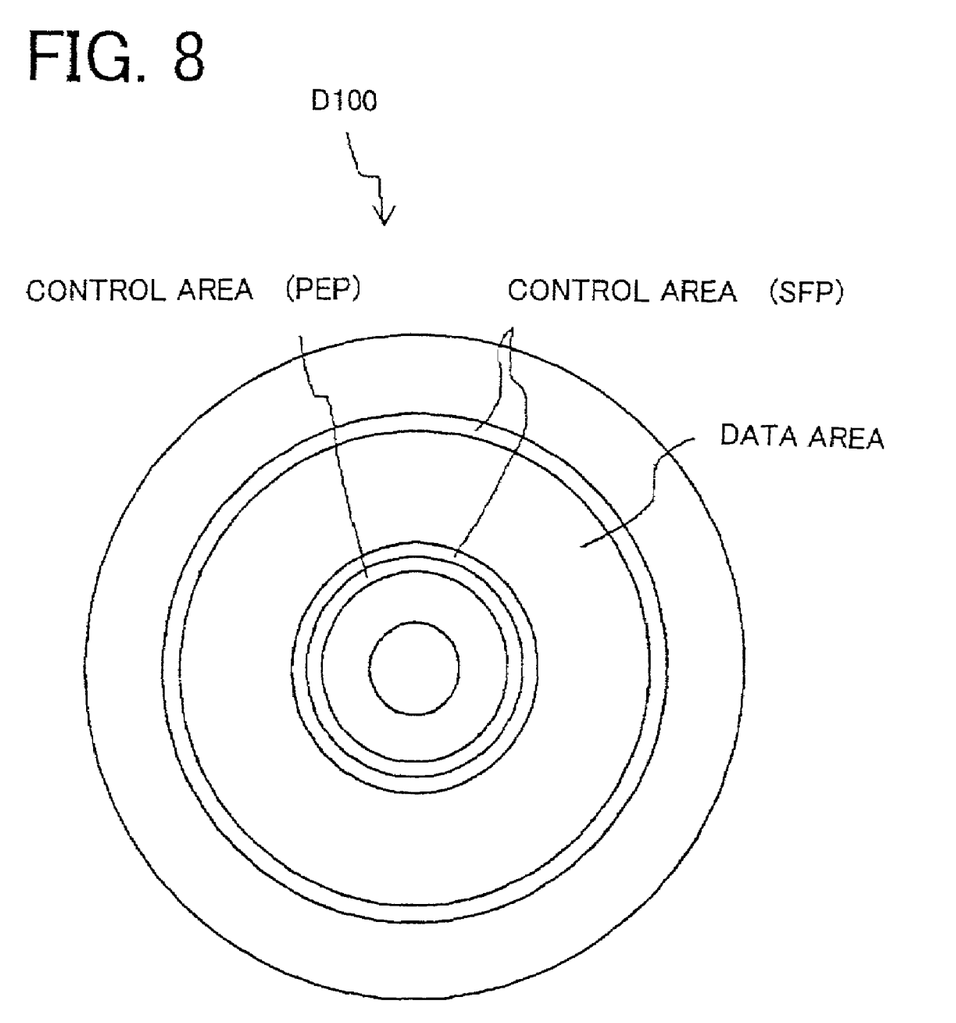
FIG. 8 is a plan view showing a schematic structure of the recording surface of the optical disc, which is one example of a pre-format.

FIG. 8 shows a schematic structure of a recording surface of an optical disc, which is recorded by one example of a pre-format. As shown in FIG. 8, an optical disc D100 comprises a control area and a data area. In the control area, control data, which deal with recording/reproducing conditions, e.g., recording power of a light beam, a recording modulation method, etc., when recording the information data into the data area, are recorded. Moreover, the control area is separated into a PEP (Phase Encoded Part) area, where one portion of the control data are recorded in the form of a PEP signal, and a SFP (Standard Formatted Part) area, where another portion of the control data are recorded in the form of a SFP signal. Incidentally, in the data area, the information data to be reproduced are recorded as the SFP signal.

Figure 9:
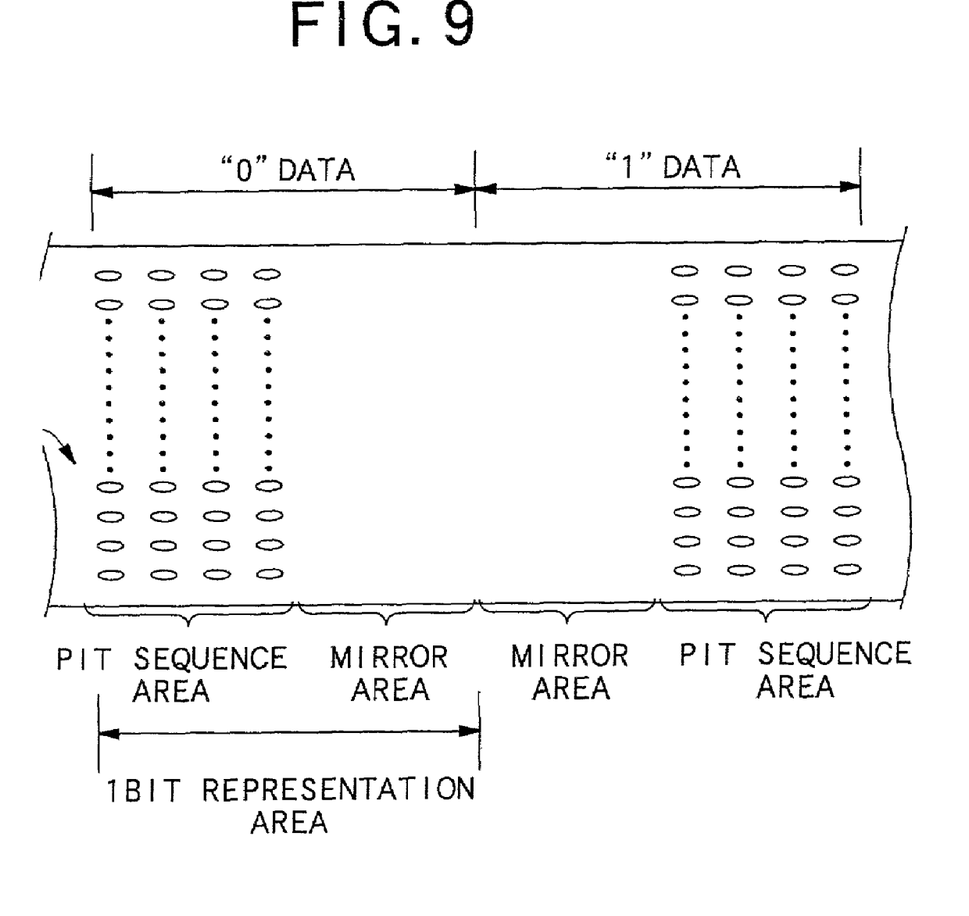
FIG. 9 is a magnified partial plan view showing a pit array for the PEP signal recorded in the PEP area of the optical disc of FIG. 9.

FIG. 9 is an explanatory drawing indicative of a pit array of the PEP signal recorded in the PEP area. The PEP signal is formed by a pair of a pit sequence area, in which a pit sequence is formed, and a mirror area, in which the pit sequence is not formed (but remained as a mirror like surface), within an area indicative of 1 bit, i.e., a "1 bit representation area", on one track. For example, if the data to be recorded is "0", the first half portion of the 1 bit representation area is the pit sequence area, and the latter half portion is the mirror area. In the same manner, if the data to be recorded is "1", the first half portion of the 1 bit representation area is the mirror area and the latter half portion is the pit sequence area. In other words, changing from the pit sequence area to the mirror area represents "0", and changing from the mirror area to the pit sequence area represents "1".

Moreover, each of the same data is recorded in respective one of the tracks in the PEP area by the CAV (Constant Angular Velocity) method. The pit sequence area and the mirror area of each track are arrayed in a line in the direction of a radius of the disc, i.e., in the radial direction, as shown in FIG. 9.

In case of reading out the PEP signal from the PEP area formed in the above mentioned manner, a reproducing apparatus does not have to use a tracking servo which allows a reading beam to follow and trace one track. In other words, because the same signal is recorded by the CAV method as the PEP signal in the PEP area, as shown in FIG. 9, the pit sequence area and the mirror sequence area within each track are arrayed or oriented in the direction of the radius of the disc. Even when the disc is rotationally driven and the reading beam crosses the track sequences in the PEP area diagonally in such a condition that the tracking servo is open, because the pit sequence area and the mirror area clearly can be distinguished from each other, it is possible to read out the data by detecting a condition of changing from the pit sequence area to the mirror area, or changing from the mirror area to the pit sequence area. The distinguishing between the pit sequence area and the mirror area can be realized, for example, by using a LPF (Low Pass Filter), which employs a long period enough for a repetition period of the pit sequence as a cut-off period.

On the other hand, the SFP signal is a so-called standard formatted signal or a standard type signal, which carries information by the presence and absence of the pit, and the reproducing apparatus needs the tracking servo which allows the reading beam to follow one track because the information to be recorded in each track is different from each other.

Figure 10:
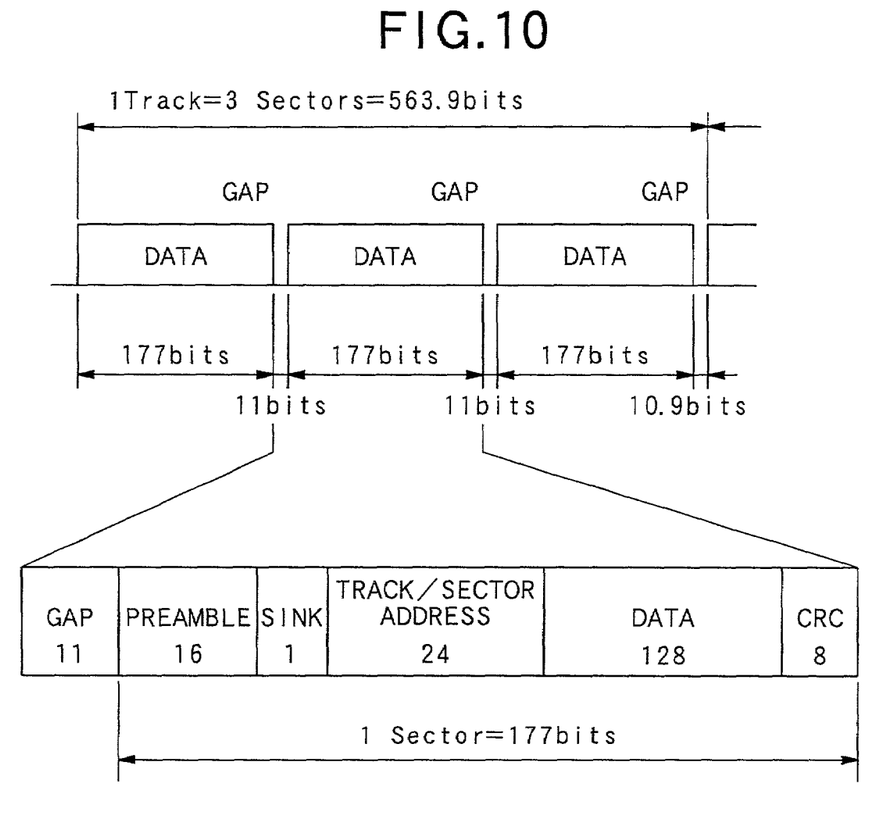
FIG. 10 is a diagram showing one example of a data structure in the PEP area of the optical disc of FIG. 9.

FIG. 10 shows one example of the data structure in the PEP area. As shown in FIG. 10, the PEP area is recorded by the CAV method, and the amount of information on each track is constant e.g., 563.9 bits. One track consists of the integral number of sectors, e.g., 3 sectors. Each sector consists of, for example, 177 bits in the information amount, and a gap equivalent to 11 bits or 10.9 bits is formed between the sectors. Each sector consists of a preamble of 16 bits, a synchronized detecting sink of 1 bit, a track address/sector address of 24 bits, a control data of 128 bits, and an cyclic redundancy code (CRC) of 8 bits.

The control data includes signals relating to the following; an identification signal to distinguish the servo method, the reflectance ratio of the disc, the distinction CAV/CLV (Constant Linear Velocity) in the data area, the reading power, the distinction between the tracks (the land or the groove), and so on. In this manner, in the PEP area, each of the same control data is recorded in each of 3 sectors on one track, and they are recorded such that each of the same signals is aligned in a position with the same radius in respective one of the tracks as for a plurality of tracks.

Figure 11:
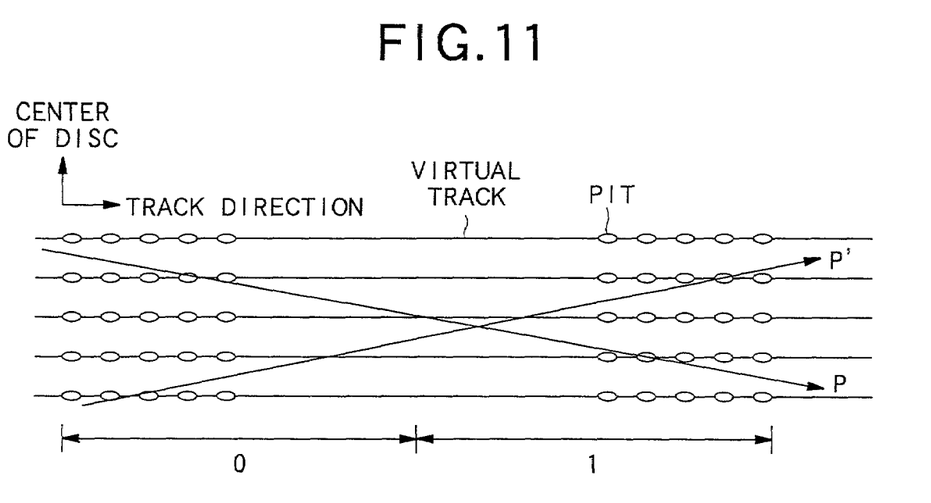
FIG. 11 is a diagram showing an operation of reading a signal in the PEP area of the optical disc of FIG. 9.

FIG. 11 is an explanatory drawing indicative of the operation of reading the signal in the PEP area. As shown with the arrows P and P' in FIG. 11, the reading beam irradiated from an optical pickup in the reproducing apparatus, in which the tracking servo is open, crosses a plurality of tracks in the PEP area in the direction from the inner circumference to the outer circumference, or in the opposite direction, depending on the eccentricity of the disc. Since each of the same signals is recorded in the respective one of the plurality of tracks in the PEP area, by the CAV method, i.e., in such a way that the same signals are aligned in the positions with the same radius in the respective one of the tracks, the substantially same RF signal as one reproduced in tracing the surface of the same track can be reproduced, even if a point for detecting the information of the optical pickup, i.e., the reading beam, crosses each track.

In this manner, since the PEP signal recorded in the PEP area is arranged such that it can be read out without the tracking servo, the combination of the mirror portion and a plurality of pits indicating 1 bit is recorded with a much larger size than the pit size in the SFP area. In other words, the combinations are recorded with a low density.

As for the multi-layered disc as explained above with reference to FIG. 8 to 11, it is desirable that the above mentioned control data are recorded in the inner circumferential portion of each recording layer, and that the multi-layered disc reproducing apparatus can read out the information data in the data area of each recording layer on the basis of the control data in the PEP area.

In view of the above, the present embodiment is constructed such that the control data desired to be reproduced in the recording layer can be accurately read out, and thereby the information data in the data area of the recording layer can be certainly read out, as described hereinbelow, with reference to FIG. 1 to FIG. 7.

Figure 1:
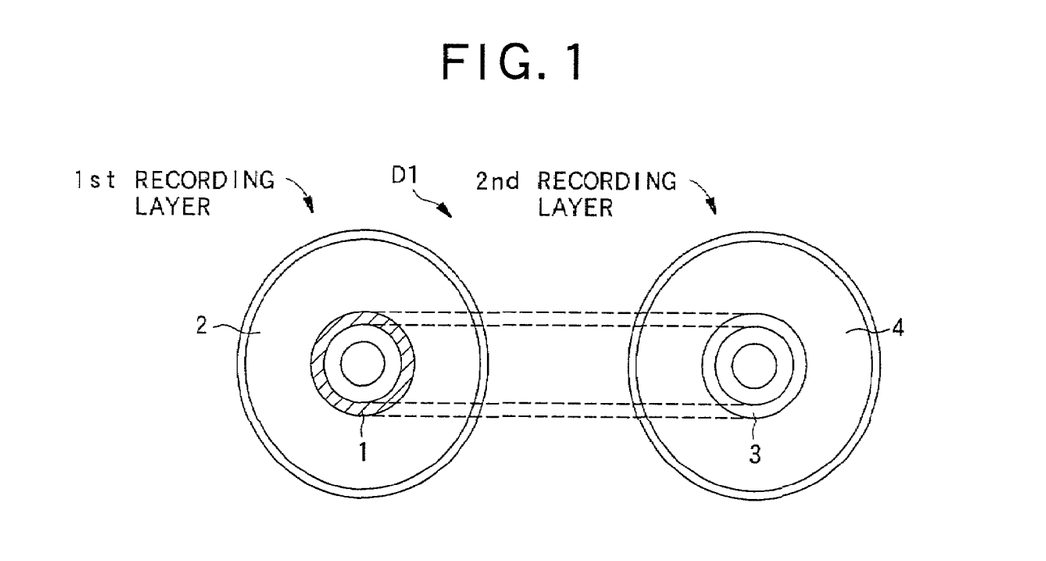
FIG. 1 is a diagram showing a pre-format structure of each recording layer, i.e., the first layer and the second layer, of an optical disc D1 whose one side has two layers, as a multi-layered disc of the first embodiment of the present invention.

FIG. 1 shows a pre-format structure of each recording layer, i.e., a first recording layer and a second recording layer, of an optical disc D1 whose one side has two layers, as a multi-layered disc of the first embodiment of the present invention.

Incidentally, the optical disc D1 is formed such that a transparent substrate is laminated with the first recording layer, a middle reflective layer, the second recording layer, and a reflective layer in this order.

As shown in FIG. 1, the first recording layer of the optical disc D1 is divided into two areas (as in the left half of FIG. 1). One is a PEP area 1 as a control data recording area placed on the inner circumferential side, and another is a data area 2 as an information data recording area placed on the outer circumferential side.

In the PEP area 1, various kinds of control data, such as the number of recording layers of the optical disc D1, a layer number of each recording layer, identification information, which indicates whether each recording layer can only read out information data or can record information data, a reproducing control method needed for reproducing the information data recorded in each recording layer and the like (hereinbelow, those are referred to as "PEP data") are recorded.

Furthermore, the information data to be reproduced are recorded in the data area 2. The information data is recorded as a SFP signal.

Incidentally, the information data in the data area 2 include the control data needed for reproducing the respective data, such as address information and the like, in the recording layer.

On the other hand, the second recording layer is divided into two areas (as in the right half of FIG. 1). One is a dummy area 3 placed on the inner circumferential side, and another is a data area 4 placed on the outer circumferential side.

The dummy area 3 is placed at a position to be superimposed with the PEP area 1 of the first recording layer in the direction of the normal line of the disc. The dummy data, which are "0" data or "1" data or a combination of them, are recorded as the SFP signal.

Moreover, the information data to be reproduced are recorded in the data area 4. The information data are also recorded as the SFP signal, as is the case with the information data in the data area 2 in the first recording layer.

Incidentally, the information data in the data area 4 include the control data needed for reproducing the respective data, such as the address information and the like, in the recording layer, as is the case with the data area 2.

The optical disc D1 may be schematically constituted as mentioned above, and the respective data in each recording layer are reproduced by a reproducing apparatus S1 described below.

Figure 2:
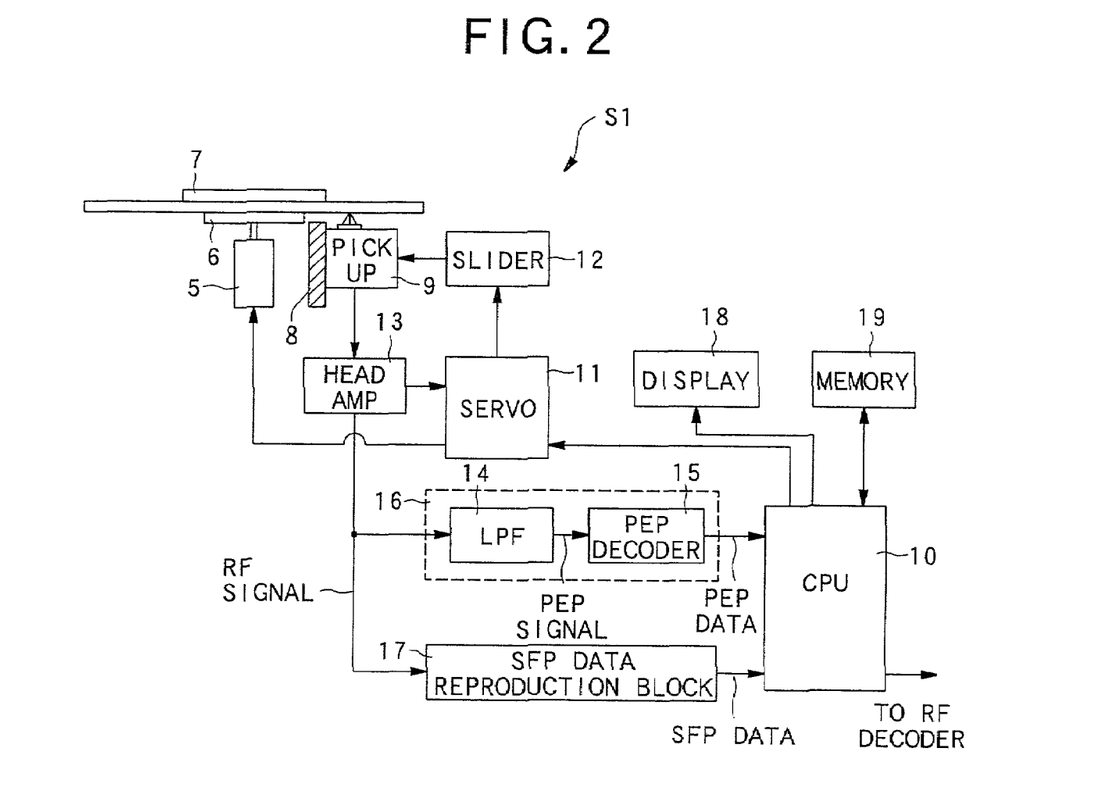
FIG. 2 is a block diagram of a multi-layered disc reproducing apparatus of the embodiment of the present invention.

FIG. 2 is a block diagram of the multi-layered disc reproducing apparatus Si of the preferred embodiment of the present invention.

In FIG. 2, the reproducing apparatus S1 is provided with a spindle motor 5, a turn table 6 fixed on the rotation axis of the spindle motor 5, a damper 7, a stopper 8, an optical pickup 9, a CPU (Central Processing Unit) 10, a servo device 11, a slider 12, a head amplifier 13, a PEP data reproduction block 16, a display device 18, and a memory device 19. Incidentally, the PEP data reproduction block 16 has a LPF (Low Pass Filter) 14 and a PEP decoder 15.

In the reproducing apparatus S1, the optical disc D1 is attached to be rotatable, by holding the optical disc D1 between the damper 7 and the turn table 6 fixed on the rotation axis of the spindle motor 5. Then, in the reproducing apparatus S1, the CPU 10, as one example of a controlling device for controlling each constitutional element, controls the servo device 11 according to a reproduction command. In response to this, the servo device 11 controls a rotation of the spindle motor 5, as the occasion demands, so that the optical disc D1 can be rotated. At the same time, the servo device 11 also controls the slider 12, as one example of a moving device for moving the pickup 9, to move the pickup 9 along the direction of the disc radius as the occasion demands, to thereby make the reading light focus on a required recording layer at the position of the pickup 9, so that the recorded data can be read out.

The stopper 8 is a stopping member to stop the optical pickup 9 in the predetermined initial position on the inner circumferential side of the disc. The stopper 8 is placed such that the reading light is irradiated onto the PEP area 1 or the dummy area 3 superimposed therewith, when the pickup 9 is at the above mentioned initial position.

The pickup 9 is one example of the optically reading device as to the optical disc and is placed to make it possible to move the reading light through the slider 12 in the direction of the radius of the disc. According to the control from the servo device 11 in response to the control from the CPU 10, the pickup 9 makes the reading light focus on either of the recording layers in the optical disc D1 as a multi-layered disc. Then, the pickup 9 receives the reflective light from the recording layer with the not-illustrated light receiving element, converts it into an electric signal, and supplies it to the head amplifier 13.

The head amplifier 13 generates a servo controlling signal and an RF (Radio Frequency) signal on the basis of the received electric signal, supplies the servo controlling signal to the servo device 11, and also supplies the RF signal to the PEP data reproduction block 16 and the SFP data reproduction block 17.

The PEP data reproduction block 16 is one example of a device for reproducing the control data recorded as the PEP signal in the control information record area of the multi-layered disc, i.e., a device for reproducing the PEP data. The LPF 14, as one example of a low pass filter, extracts the PEP signal from among the RF signal supplied from the head amplifier 13, and supplies it to the PEP decoder 15. The PEP decoder 15 reproduces the PEP data on the basis of the PEP signal supplied from the LPE 14 under the control of the CPU 10, and supplies it to the CPU 10.

The SFP data reproduction block 17 is one example of a device for reproducing the SFP data such as the information data, the control data, and so on, which are recorded as the SFP signals. The SFP data reproduction block 17 is also one example of a device for extracting the SFP signal, which carries each information data in the data area in each recording layer of the optical disc D1, to thereby reproduce the information data on the basis of the SFP signal. Namely, the SFP data reproduction block 17 extracts the SFP signal of the information data in the data area of the recording layer on which the pickup 9 establishes the focusing, from among the RF signals supplied from the head amplifier 13, reproduces the SFP data using this SFP signal by the decoder thereof, and supplies the reproduced SFP data to to the CPU 10.

The CPU 10 controls the memory device 19, as one example of a device for temporally storing various kinds of data, to store the above mentioned PEP data supplied from the PEP data reproduction block 16. Moreover, the CPU 10 supplies the SFP data, which are supplied from the SFP data reproduction block 17, to a not-illustrated RF decoder. The CPU 10 also extracts the above mentioned control data and controls the memory device 19 to store the control data, if the SFP data include the control data. As a result, the CPU 10 can acquire the PEP data, which are needed for reproducing the information data in each recording layer, and the control data, which are included in the SFP data, as the occasion demands. Then, the CPU 10 performs a reproduction control for the information data of the optical disc D1 on the basis of the control data in this kind, and also controls the display device 18 to display the reproduced information data, the control information and so on, as the occasion demands.

With reference to the reproducing apparatus S1 constituted like the above, when the information data in each recording layer of the optical disc D1 are reproduced, the PEP data needed for reproducing the information data in each recording layer of the optical disc D1 are firstly reproduced, and they are stored into the memory device 19. Then, an address and the recording layer of the information data to be reproduced are acquired on the basis of the stored PEP data, and the information data are reproduced from the relevant address.

Next, a method of reproducing the PEP data of the optical disc D1 by the reproducing apparatus S1 will be explained with reference to FIG. 3A through FIG. 5.

The reproducing apparatus S1 moves the pickup 9 to the initial position, and irradiate the first recording layer or the second recording layer of the optical disc D1 with the reading beam, and then receives the reflective light from the rotating optical disc D1, as the CPU 10 controls the servo device 11 based on the reproducing command.

Figure 3A:
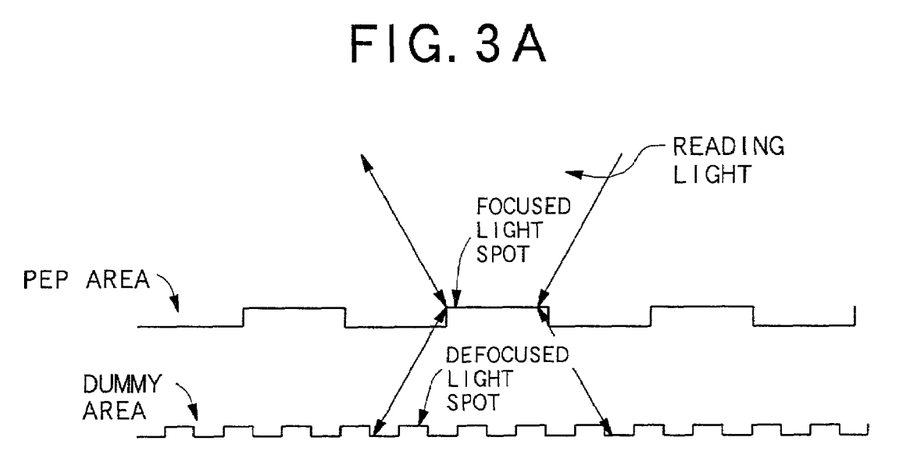
FIG. 3A is a cross sectional view of each recording layer showing one focus condition of the reading beam in each recording layer, while irradiating the reading beam onto the optical disc, in the embodiment.
Figure 3B:
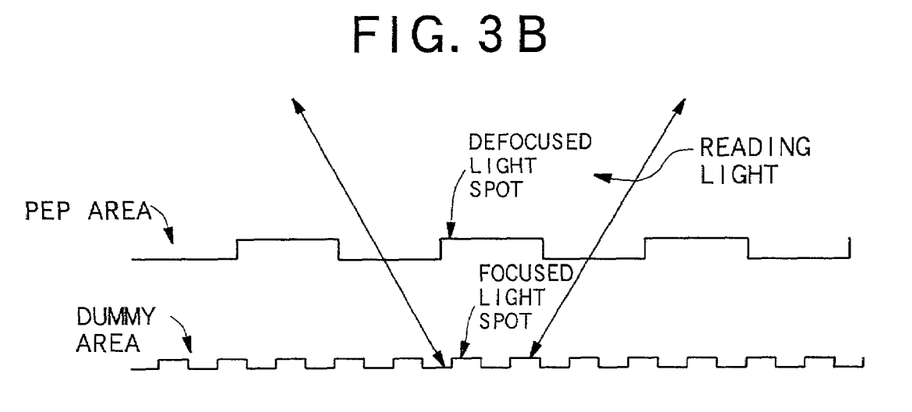
FIG. 3B is a cross sectional view of each recording layer showing another focus condition of the reading beam in each recording layer, while irradiating the reading beam onto the optical disc, in the embodiment.

Each of FIG. 3A and FIG. 3B is a cross sectional view of the recording layers showing a focus condition of the reading beam in respective one of the recording layers at the initial position while irradiating the reading beam onto the optical disc. More concretely, FIG. 3A shows that the reading light focuses on the PEP area 1 in the first recording layer. FIG. 3B shows that the reading light focuses on the dummy area 3 in the second layer.

As shown in FIG. 3A, when the reading beam emitted from the pickup 9 is controlled to focus on the PEP area in the first recording layer, the reflective light from the pit sequence area recorded in the PEP area is generated. At the same time, the reflective light from the second recording layer is also generated, because the reading beam irradiated onto the PEP area is partially irradiated onto the second recording layer after passing through the first recording layer. In other words, the reflective light from the optical disc is such a light that the reflective light from the PEP area in the first recording layer is superimposed by the reflective light from the pit sequence carrying the dummy data in the second recording layer.

However, because the reading beam irradiated onto the second recording layer is controlled to focus on the surface of the first recording layer, the second recording layer becomes in the defocus condition corresponding to the interlayer distance between the first recording layer and the second recording layer, and its spot size becomes larger than one in the focus condition. In other words, the spot size in the defocus condition does not have enough resolution to read out the pit sequence carrying the dummy data which are recorded as the SFP signal, and the SFP signal component included in the reflective light becomes extremely small.

Figure 4A:
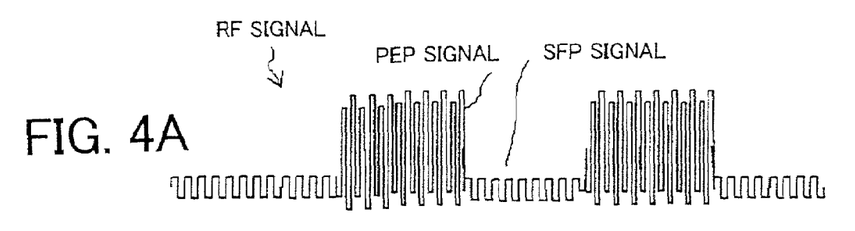
Figure 4B:
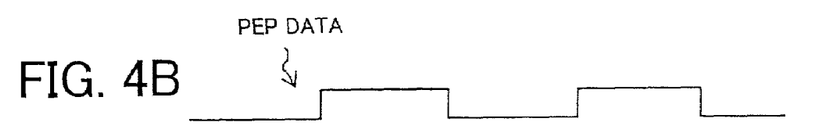

Therefore, as shown in FIG. 4A, the main component of RF signal outputted from the pickup 9 through the head amplifier 13 becomes a component of the reflective light from the pit sequence area and the mirror area in the PEP area, and the RF signal becomes the PEP signal, which is binary signal, indicative of changing from the pit sequence area to the mirror area or from the mirror area to the pit sequence area, as shown in FIG. 4B, after the LPF 14 removes, from the RF signal, a high frequency component, i.e., a component relating to the pit sequence.

On the other hand, as shown in FIG. 3B, when the reading beam emitted from the pickup 9 is controlled to focus on the dummy area in the second reading layer, the reflective light from the pit sequence, which carries the dummy data recorded in the dummy area, is generated. At the same time, the reflective light from the reading beam irradiated onto the surface of the first recording layer is also generated. In other words, the reflective light is such a light that the reflective light from the pit sequence, which carries the dummy data in the second recording layer, is superimposed by the reflective light from the PEP area of the first recording layer.

Here, because the reading beam irradiated onto the surface of the first recording layer is controlled to focus on the surface of the second recording layer, the surface of the first recording layer becomes in the defocus condition corresponding to the interlayer distance between the first recording layer and the second recording layer, and its spot size becomes larger than one in the focus condition. In other words, the spot size in the defocus condition does not have enough resolution to read out the pit sequence in the pit sequence area which is recorded in the PEP area, and the component of the pit sequence included in the reflective light becomes extremely small. Nevertheless, this spot size gives enough resolution to read out the repetition component between the mirror area and the pit sequence area, which becomes the PEP signal.

Figure 4C:
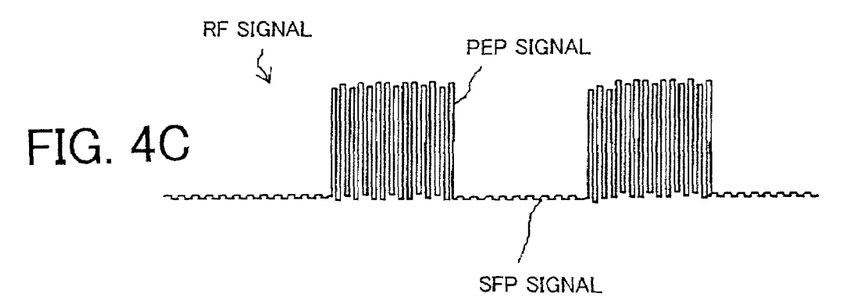
Figure 4D:
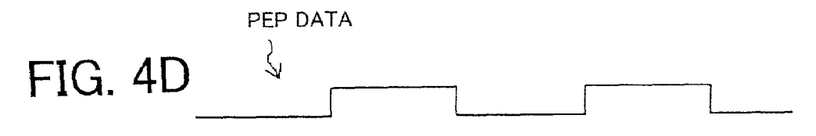

Therefore, as shown in FIG. 4C, the main component of the RF signal outputted from the pickup 9 through the head amplifier 13 is the high frequency component depending on the pit sequence recorded in the dummy area 3 and the PEP signal component (which is the repetition component between the pit sequence area and the mirror area in the PEP area with reference to the first recording layer). From the RF signal, the high frequency component is removed by the LPF 14. Thus, from the LPF 14, the PEP signal indicative of the changing from the pit sequence area to the mirror area in the PEP area or the changing from the mirror area to the pit sequence area, is extracted, as shown in FIG. 4D.

In this manner, whenever the reading beam is focused on either of the recording layers at the initial position, it is possible to extract the PEP signal through the LPF 14.

Figure 5:
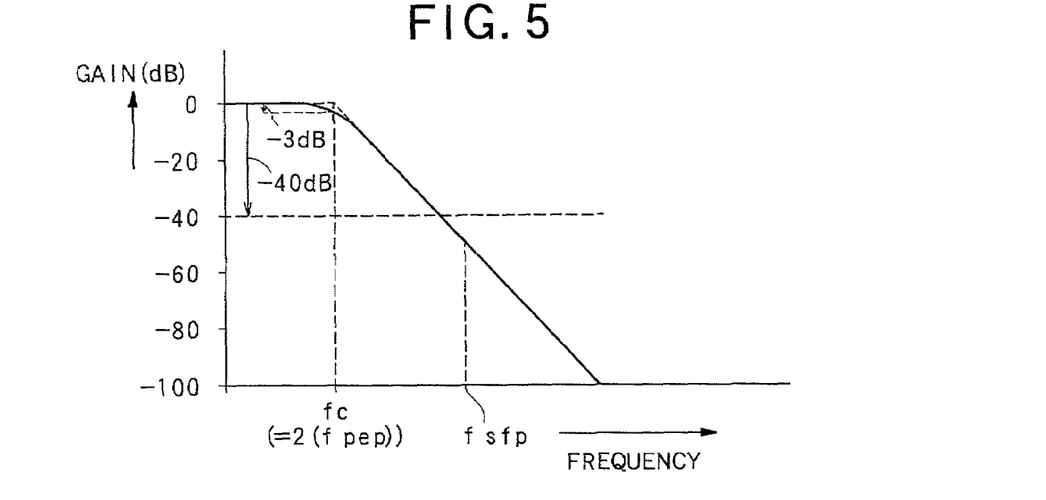
FIG. 5 is a graph showing one example of filter characteristics of a LPF 14, in the embodiment.

FIG. 5 shows one example of the filter characteristic of the LPF 14. The LPF 14 employs the double frequency of the repetition frequency in the 1 bit representation area of the PEP signal (the frequency is referred to "fpep"), as a cut-off frequency (fc). Its attenuation characteristic has attenuation gains more than 40 dB with respect to the standard level of the pertinent filter, for example 0 dB, at the repetition frequency of the SFP signal with the longest pit (the frequency is referred to "fsfp"). This characteristic allows the PEP signal to pass through the LPF 14, and can remove the high frequency component including the pit sequence component in the PEP area and the SFP signal component, which is a noise due to the dummy data, from the RF signal.

With reference to the construction in this kind, the LPF 14 extracts the PEP signal shown in FIG. 4B and supplies it to the PEP decoder 15, if the RF signal shown in FIG. 4A is supplied by the pickup 9 through the head amplifier 13. Alternatively, the LPF 14 extracts the PEP signal shown in FIG. 4D and supplies it to the PEP decoder 15, if the RF signal shown in FIG. 4C is supplied by the pickup 9 through the head amplifier 13. The PEP decoder 15 decodes the supplied PEP signal and reproduces the PEP data.

As mentioned above, the reproducing apparatus S1 reproduces the PEP data carrying the identification information and the lamination order information of the recording layer of the optical disc D1, the information related to the information data in each recording layer and the like. Then, on the basis of this reproduced PEP data, the reproducing apparatus S1 controls the pickup 9 and reproduces the information data from the data area in each recording layer.

In the above explanation, such an example has been described that, in the multi-layered optical disc comprising the several recording layers laminated in the direction of the normal line of the disc, the PEP area is provided only in the first recording layer from the side of the surface that the reading beam is irradiated, and the mirror area and the pit sequence area carrying the PEP data are formed in this PEP area. The present invention, however, is not limited to this example. For example, the PEP area may be formed in the second recording layer. Even in this case, it is possible to accurately extract the PEP signal even if the reading beam is focused on any one of the recording layers among a plurality of the recording layers, as mentioned above.

Figure 6:
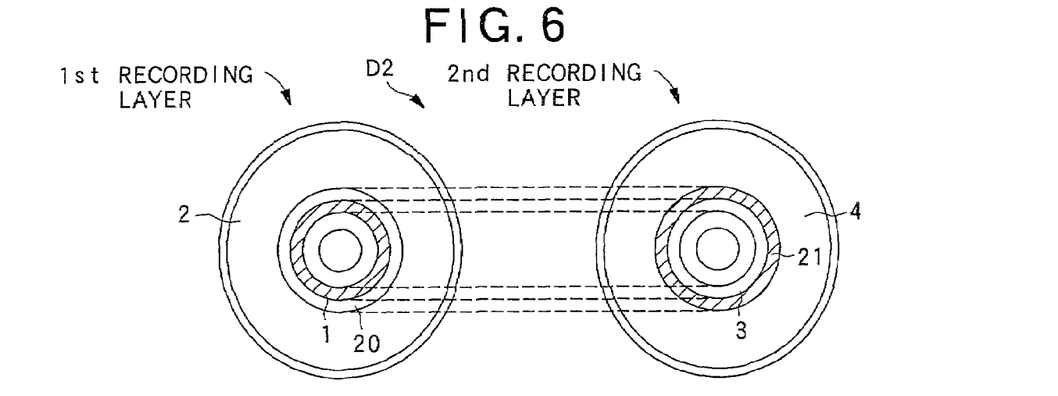
FIG. 6 is a diagram showing a pre-format structure of each recording layer of an optical disc D2 whose one side has two layers, in a multi-layered disc of the second embodiment of the present invention.

Moreover, the PEP data as the control data may be recorded in the plurality of the recording layers. In this case, it is desirable that a plurality of PEP data are not superimposed or overlapped with each other in the direction of the normal line of the disk. FIG. 6 shows one example of such a structure.

In FIG. 6, the first recording layer of the optical disc D2 is divided into 3 areas in such a manner that a PEP area 1 as the control data recording area, a dummy area 20, and a data area 2 as the information data recording area are arranged in this order from the inner circumferential side (as in the left half of FIG. 6). Moreover, the second recording layer is divided into 3 area in such a manner that a dummy area 3 and a PEP area 21 as the control data recording area, and a data area 4 as the information data recording area are arranged in this order from the inner circumferential side (as in the right half of FIG. 6).

The PEP area 1 comprises an area which is superimposed with the dummy area 2 in the second recording layer in the direction of the normal line of the recording surface. In the same manner, the dummy area 20 comprises an area which is superimposed with the PEP area 21 in the second recording layer in the direction of the normal line of the recording surface. Incidentally, each one of the PEP areas in the respective one of the recording layers is never superimposed with each other in the above mentioned direction of the normal line. Moreover, the dummy data are recorded as the SFP signal area in each dummy area.

Even under this kind of constitution shown in FIG. 6, it is possible to extract the PEP signal through the LPF 14, even if any one of the recording layers is focused by the reading beam, in the same manner as the multi-layered disc shown in FIG. 1.

Figure 7:
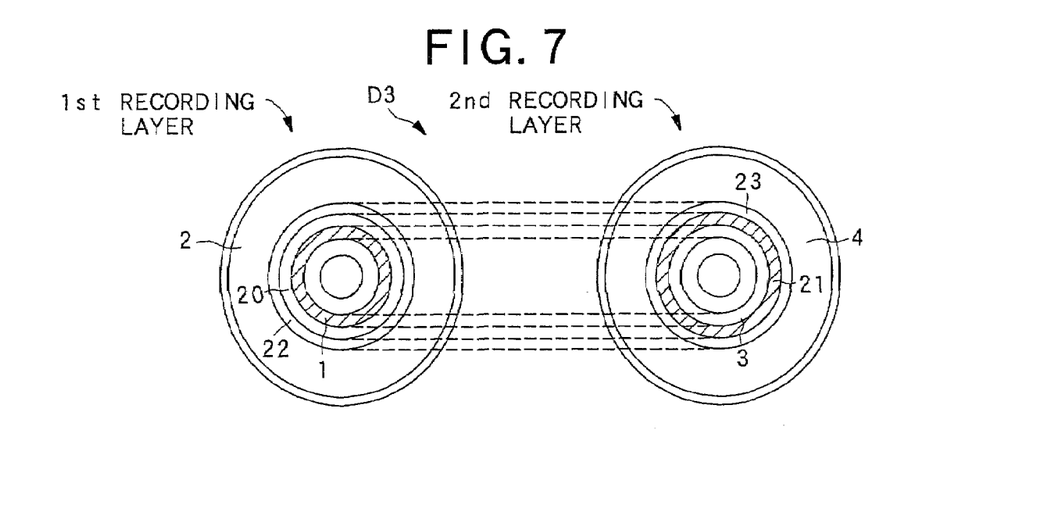
FIG. 7 is a diagram showing a pre-format structure of each recording layer of an optical disc D3 whose one side has two layers, in a multi-layered disc of the third embodiment of the present invention.

In case that the PEP area and the SFP area are required as the control area, it may be constituted such as shown in FIG. 7.

Namely, the PEP area 1, the dummy area 20 and the SFP area 22 are arranged in this order from the inner circumferential side, as for the first recording layer, for example (as in the left half of FIG. 7). Moreover, as for the second recording layer, the dummy area 3, the PEP area 21 and the SFP area 23 area are arranged in this order from the inner circumferential side (as in the right half of FIG. 7). It is important for the relevant constitution to position the PEP area 1 and the PEP area 21 not to be superimposed with each other in the direction of the normal line of the recording surface.

In addition, the optical disc of each one of the above mentioned relative embodiments is constituted by the one side multi-layered disc, which has two layers of the recording layer on one side of the disc. However, the multi-layered disc of the present invention is not limited to this. The multi-layered disc may be formed with a plurality of layers, which are equal to or more than three layers, on one side or on both sides of the disc.

Moreover, the PEP area may be provided in the multi-layered disc in any one of the recording layers without depending on the number of the recording layers of the disc. It may be provided in a plurality of different areas in the same recording layer. In this case, as to each surface of the disc, the dummy area may be formed in an area of another of the recording layers, which is superimposed with the relevant PEP area in one of the recording layers in which the PEP area is formed.

Furthermore, each of the above mentioned embodiments is constituted such that the dummy data having the same recording density as the one of the information data in each data area are recorded as the SFP signal in each dummy area of the optical disc. However, the prevent invention is not limited to this. The dummy area may comprise a non-signal area in which data are not recorded, for example.

In addition, as for each of the above mentioned embodiments, it has been explained that the optical disc as the multi-layered disc is a disc only for reproducing one or whole portion of the information data, which are recorded in advance in the data area in each recording layer. However, it is not necessary that the information data are recorded in each data area in advance. It is also possible that the optical disc as the multi-layered disc is a disc for recording information data which has such a structure that one portion of the relative recording layers or whole recording layers comprises the data area where the information data area not recorded.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description and all changes which come within the meaning and range of equivalency of the claims are therefore intended to be embraced therein.

The entire disclosure of Japanese Patent Application No. 2000-339746 filed on Nov. 7, 2000 including the specification, claims, drawings and summary is incorporated herein by reference in its entirety.

What is claimed is:

1. A multi-layered disc reproducing apparatus for reproducing information data recorded on a multi-layered disc comprising a plurality of recording layers laminated with each other in a direction of a normal line of said recording layers, in each of which an information data recording area for recording the information data and a control data recording area for recording control data to control an operation of recording and/or reproducing the information data are disposed on a same plane, the control data being recorded by a CAV method over a plurality of tracks in said control data recording area, the control data including a control data being recorded as a PEP signal, said control data recording area in each of said recording layers being disposed such that said control data recording area of one of said recording layers is not superimposed with said control data recording area of another of said recording layers in the direction of the normal line, said multi-layered disc reproducing apparatus comprising:

a detection signal outputting device for outputting a detection signal, which carries the control data in said control data record area, on the basis of a reflected light obtained by an irradiation of a reading light onto said control data recording area;

a control data reproducing device for reproducing the control data on the basis of the detection signal outputted from said detection signal outputting device; and an information data reproduction controlling device for reproducing the information data recorded in said information data recording area on the basis of the reproduced control data wherein said control data reproducing apparatus comprises:

a low pass filter for extracting a control data signal based on the control data from the detection signal; and a control data decoder for generating the control data by the control data signal extracted by said low pass filter, wherein said low pass filter has a cut-off frequency, which is a double frequency of a repetition frequency of a longest pit carrying the control data, and an attenuation characteristic, which attenuates the detection signal from a standard level of said low pass filter by the cut-off frequency.

2. A multi-layered disc reproducing apparatus for reproducing information data recorded on a multi-layered disc comprising a plurality of recording layers laminated with each other in a direction of a normal line of said recording layers, in each of which an information data recording area for recording the information data and a control data recording area for recording control data to control an operation of recording and/or reproducing the information data are disposed on a same plane, the control data being recorded by a CAV method over a plurality of tracks in said control data recording area, the control data including a control data being recorded as a PEP signal, said control data recording area in each of said recording layers being disposed such that said control data recording area of one of said recording layers is not superimposed with said control data recording area of another of said recording layers in the direction of the normal line, said multi-layered disc reproducing apparatus comprising:

a detection signal outputting device for outputting a detection signal, which carries the control data in said control data record area, on the basis of a reflected light obtained by an irradiation of a reading light onto said control data recording area;

a control data reproducing device for reproducing the control data on the basis of the detection signal outputted from said detection signal outputting device; and an information data reproduction controlling device for reproducing the information data recorded in said information data recording area on the basis of the reproduced control data, wherein said control data reproducing apparatus comprises:

a low pass filter for extracting a control data signal based on the control data from the detection signal; and a control data decoder for generating the control data by the control data signal extracted by said low pass filter, wherein said low pass filter has an attenuation characteristic which attenuates more than 40 dB from a standard level of said low pass filter at a repetition frequency of a SFP (Standard Formatted Part) signal having a longest pit.

* * * * *